(12) United States Patent
Carro

(10) Patent No.: US 6,771,283 B2
(45) Date of Patent: Aug. 3, 2004

(54) METHOD AND SYSTEM FOR ACCESSING INTERACTIVE MULTIMEDIA INFORMATION OR SERVICES BY TOUCHING HIGHLIGHTED ITEMS ON PHYSICAL DOCUMENTS

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 09/841,930

(22) Filed: Apr. 25, 2001

(65) Prior Publication Data

US 2002/0087598 A1 Jul. 4, 2002

(30) Foreign Application Priority Data

Apr. 26, 2000 (FR) .......................................... 00 480037

(51) Int. Cl.$^7$ ................................................ G09G 5/00
(52) U.S. Cl. ........................ 345/702; 345/863; 345/173; 345/174; 345/175; 345/176; 345/178; 345/180; 178/18.01; 178/18.09
(58) Field of Search ................................ 345/702, 863, 345/180, 173–179, 104; 178/18.01–18.11, 19.01–19.09

(56) References Cited

U.S. PATENT DOCUMENTS 6,587,859 B2 * 7/2003 Dougherty et al. ...... 707/104.1

* cited by examiner

*Primary Examiner*—Kristine Kincaid
*Assistant Examiner*—Boris Pesin
(74) *Attorney, Agent, or Firm*—L. P. Herzberg; E. W. Petraske

(57) ABSTRACT

Method and system for selecting and accessing multimedia information/services located on a user workstation or on a server by touching finger items that are electronically illuminated over the surface of a hard-copy document or any other physical surface. The system includes: an opto-touch foil, placed over (or under) a portion of the document, used to highlight hyperlinked items over the surface of the physical document and to read coordinates of these hyperlinked items; and a user workstation for accessing the information/service associated with the hyperlinked items. Hyperlinked items are illuminated by the luminous signal for identifying and selecting hyperlinked items. When a user selects an item, the workstation receives a signal indicating the position of this selected item. The user workstation identifies, locates and accesses the information/service associated with the position of the selected item.

32 Claims, 16 Drawing Sheets

David Nash Ford

*Early British Kingdoms* http://freespace.virgin.net/

Document: 387

©CelticWorld Ltd., Binfield, Berkshire, UK (1999)

*Arthur the Myth.*

Some people believe that King Arthur is so inextricably tied up in Celtic Mythology that he must, in origin, have been, not a man at all, but a God. Like so many other characters featured in the Mabinogion, Arthur in his earliest form, appears almost entirely mythical. He and his companions have superhuman strength and abilities, and consort with giants and other mythological creatures. In the early Welsh poem "Preiddeu Annwfn", Arthur visits the Celtic Underworld, Annwfn. Even in Geoffrey and Malory, upon being fatally wounded in battle, Arthur is carried to the mystical Avalon, apparently the Underworld home of the Celtic god, Afallach. Many legends around the country attest to Arthur's immortality, for he sleeps in one of numerous caves waiting to return and lead his people. The name Arthur itself appears to derive from the Celtic word Art, meaning "bear". Coul Arthur, like so many other Celtic gods, be merely a personification of the many revered animals of the wild? Later to become humanized like Beli Mawr or Bran the Blessed. The constellation of Ursa Major or the Great Bear is, after all, sometimes known as Arthur's Wain. There was indeed a Celtic Bear-God, Artio, worshipped in Switzerland and around Trier, but she was, in fact, a goddess and there is no trace of her in Britain! Some theorists claim Arthur was a late addition to the Celtic pantheon during a resurgence on pagan worship, or possibly a mythical hero, the offering of a human and a bear. There is no evidence for either.

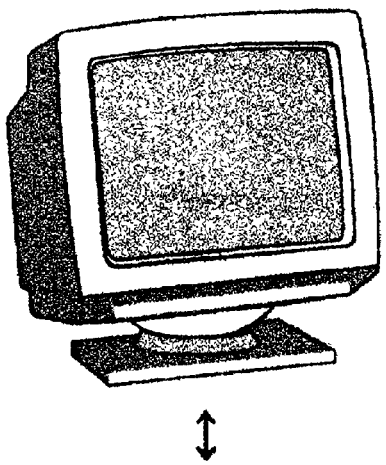

Doc 1 2 3 4 5 6 7 8 9 0 Pg

*Arthur the Myth.*

Some people believe that King Arthur is so inextricably tied up in Celtic Mythology that he must, in origin, have been, not a man at all, but a God. Like so many other characters featured in the Mabinogion, Arthur in his earliest form, appears almost entirely mythical. He and his companions have superhuman strength and abilities, and consort with giants and other mythological creatures. In the early Welsh poem "Preiddeu Annwfn", Arthur visits the Celtic Underworld, Annwfn. Even in Geoffrey and Malory, upon being fatally wounded in battle, Arthur is carried to the mystical Avalon, apparently the Underworld home of the Celtic god, Afallach. Many legends around the country attest to Arthur's immortality, for he sleeps in one of numerous caves waiting to return and lead his people. The name Arthur itself appears to derive from the Celtic word Art, meaning "bear". Coul Arthur, like so many other Celtic gods, be merely a personification of the many revered animals of the wild? Later to become humanized like Beli Mawr or Bran the Blessed. The constellation of Ursa Major or the Great Bear is, after all, sometimes known as Arthur's Wain. There was indeed a Celtic Bear-God, Artio, worshipped in Switzerland and around Trier, but she was, in fact, a goddess and there is no trace of her in Britain! Some theorists claim Arthur was a late addition to the Celtic pantheon during a resurgence on pagan worship, or possibly a mythical hero, the offering of a human and a bear. There is no evidence for either.

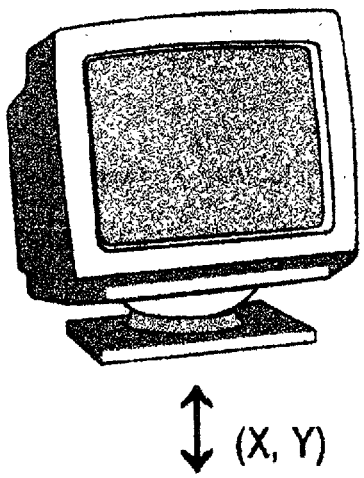

↕ (X, Y)

Doc 1 2 3 4 5 6 7 8 9 0 Pg

*Arthur the Myth.*

Some people believe that King Arthur is so inextricably tied up in Celtic Mythology that he must, in origin, have been, not a man at all, but a God. Like so many other characters featured in the▓▓▓▓ Arthur in his earliest form, appears almost entirely mythical. He and his companions have superhuman strength and abilities, and consort with giants and other mythological creatures. In the early Welsh poem "Preiddeu Annwfn", Arthur visits the Celtic Underworld, Annwfn. Even in Geoffrey and Malory, upon being fatally wounded in battle, Arthur is carried to the mystical▓▓▓▓ apparently the Underworld home of the Celtic god,▓▓▓▓ Many legends around the country attest to Arthur's immortality, for he sleeps in one of numerous caves waiting to return and lead his people. The name Arthur itself appears to derive from the Celtic word Art, meaning "bear". Coul Arthur, like so many other Celtic gods, be merely a personification of the many revered animals of the wild? Later to become humanized like▓▓▓▓ or Bran the Blessed, The constellation of Ursa Major or the Great Bear is, after all, sometimes known as Arthur's Wain. There was indeed a Celtic Bear-God, Artio, worshipped in Switzerland and around Trier, but she was, in fact, a goddess and there is no trace of her in Britain! Some theorists claim Arthur was a late addition to the Celtic pantheon during a resurgence on pagan worship, or possibly a mythical hero, the offering of a human and a bear. There is no evidence for either.

- 16 -

Fig. 9

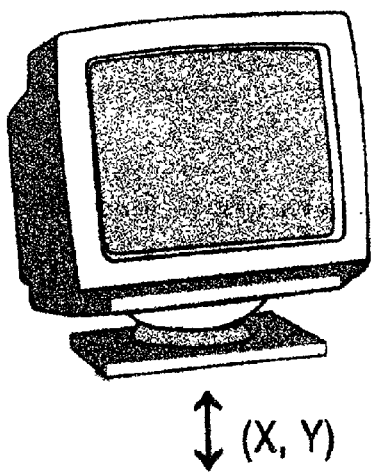

↕ (X, Y)

Doc ▓ 2 3 4 5 ▓ 7 8 9 0 ▓

*Arthur the Myth.*

*Some people believe that King Arthur is so inextricably tied up in Celtic Mythology that he must, in origin, have been, not a man at all, but a God. Like so many other characters featured in the ▓▓inogion, Arthur in his earliest form, appears almost entirely mythical. He and his companions have superhuman strength and abilities, and consort with giants and other mythological creatures. In the early Welsh poem "Preiddeu Annwfn", Arthur visits the Celtic Underworld, Annwfn. Even in Geoffrey and Malory, upon being fatally wounded in battle, Arthur is carried to the mystical▓▓on, apparently the Underworld home of the Celtic god, ▓▓lach. Many legends around the country attest to Arthur's immortality, for he sleeps in one of numerous caves waiting to return and lead his people. The name Arthur itself appears to derive from the Celtic word Art, meaning "bear". Coul Arthur, like so many other Celtic gods, be merely a personification of the many revered animals of the wild? Later to become humanized like ▓▓Mawr or Bran the Blessed. The constellation of Ursa Major or the Great Bear is, after all, sometimes known as Arthur's Wain. There was indeed a Celtic Bear-God, Artio, worshipped in Switzerland and around Trier, but she was, in fact, a goddess and there is no trace of her in Britain! Some theorists claim Arthur was a late addition to the Celtic pantheon during a resurgence on pagan worship, or possibly a mythical hero, the offering of a human and a bear. There is no evidence for either.*

- 16 -

Fig. 11

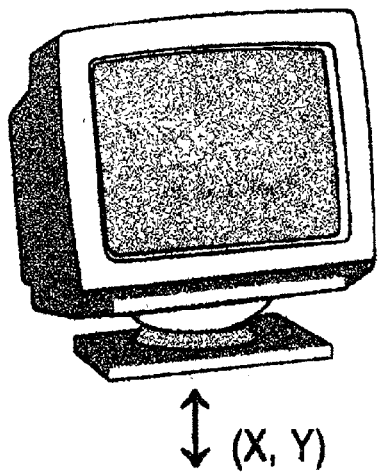

| Doc | 1 2 3 4 5 6 7 8 9 0 | Pg |

Arthur the Myth.

Some people believe that King Arthur is so inextricably tied up in Celtic Mythology that he must, in origin, have been, not a man at all but a God. Like so many other characters featured in the ▓▓inogion, Arthur in his earliest form, appears almost entirely mythical. He and his companions have superhuman strength and abilities, and consort with giants and other mythological creatures. In the early Welsh poem "Preiddeu Annwfn", Arthur visits the Celtic Underworld, Annwfn. Even in Geoffrey and Malory, upon being fatally wounded in  battle, Arthur is carried to the mystical ▓▓on, apparently the Underworld home of the Celtic god, ▓▓lach. Many legends around the country attest to Arthur's immortality, for he sleeps in one of numerous caves waiting to return and lead his people. The name Arthur itself appears to derive from the Celtic word Art, meaning "bear". Coul Arthur, like so many other Celtic gods, be merely a personification of the many revered animals of the wild? Later to become humanized like ▓▓Mawr or Bran the Blessed. The constellation of Ursa Major or the Great Bear is, after all, sometimes known as Arthur's Wain. There was indeed a Celtic Bear-God, Artio, worshipped in Switzerland and around Trier, but she was, in fact, a goddess and there is no trace of her in Britain! Some theorists claim Arthur was a late addition to the Celtic pantheon during a resurgence on pagan worship, or possibly a mythical hero, the offering of a human and a bear. There is no evidence for either.

Afallach, God of the Underworld

Afallach was the son of Lludd Llaw Ereint (the Silver-Handed). He was one of the Celtic gods of the Underworld. He ruled Avalon where he lived with his daughter, Moron, and her nine sisters. Avalon was like the Celtic heaven, a peaceful island far away where apples grew and after which it became named. It is, of course, best known as the place where the High-King Arthwyr was taken after he was fatally wounded at the Battle of Camlann. Afallach himself appears in Arthurian legends as King Evelake.

Return to Early British Kingdoms Home Page.

Doc: 387 - "Early British Kingdoms" - Pg: 16 - Afallach

Fig. 13

METHOD AND SYSTEM FOR ACCESSING INTERACTIVE MULTIMEDIA INFORMATION OR SERVICES BY TOUCHING HIGHLIGHTED ITEMS ON PHYSICAL DOCUMENTS

FIELD OF THE INVENTION

The present invention generally relates to interactive hypermedia systems and more particularly to a method and system for creating hyperlinks from selected items (e.g., words, pictures, foot notes, symbols, icons) on hard-copy documents to locally or remotely accessible servers, for highlighting by means of a light emitting source the position of each selected item, and for triggering anyone of said hyperlinks simply by touching the hard-copy document over said highlighted items.

BACKGROUND OF THE INVENTION

Internet

The Internet is a global network of computers and computers networks (the "Net"). The Internet connects computers that use a variety of different operating systems or languages, including UNIX™, DOS™, Windows™, Macintosh™, and others. To facilitate and allow the communication among these various systems and languages, the Internet uses a language referred to as TCP/IP ("Transmission Control Protocol/Internet Protocol"). TCP/IP protocol supports three basic applications on the Internet:

transmitting and receiving electronic mail, logging into remote computers (the "Telnet"), and transferring files and programs from one computer to another ("FTP" or "File Transfer Protocol").

World Wide Web

With the increasing size and complexity of the Internet, tools have been developed to help find information on the network, often called navigators or navigation systems. Navigation systems that have been developed include standards such as Archie™, Gopher™ and WAIS™. The World Wide Web ("WWW" or "the Web") is a recent superior navigation system. The Web is:

an Internet-based navigation system, an information distribution and management system for the Internet, and a dynamic format for communicating on the Web.

The Web seamlessly, for the use, integrates format of information, including still images, text, audio and video. A user on the Web using a graphical user interface ("GUI", pronounced "gooey") may transparently communicate with different host computers on the system, different system applications (including FTP and Telnet), and different information formats for files and documents including, for example, text, sound and graphics.

Hypermedia

The Web uses hypertext and hypermedia. Hypertext is a subset of hypermedia and refers to computer-based "documents" in which readers move from one place to another in a document, or to another document, in a non-linear manner. To do this, the Web uses a client-server architecture. The Web servers enable the user to access hypertext and hypermedia information through the Web and the user's computer. (The user's computer is referred to as a client computer of the Web Server computers.) The clients send requests to the Web Servers, which react, search and respond. The Web allows client application software to request and receive hypermedia documents (including formatted text, audio, video and graphics) with hypertext link capabilities to other hypermedia documents, from a Web file server.

The Web, then, can be viewed as a collection of document files residing on Web host computers that are interconnected by hyperlinks using networking protocols, forming a virtual "web" that spans the Internet.

Uniform Resource Locators

A resource of the Internet is unambiguously identified by a Uniform Resource Locator (URL), which is a pointer to a particular resource at a particular location. A URL specifies the protocol used to access a server (e.g. HTTP, FTP, . . . ), the name of the server, and the location of a file on that server.

Hyper Text Transfer Protocol

Each Web page that appears on client monitors of the Web may appear as a complex document that integrates, for example, text, images, sounds and animation. Each such page may also contain hyperlinks to other Web documents so that a user at a client computer using a mouse may click on icons and may activate hyperlink jumps to a new page (which is a graphical representation of another document file) on the same or a different Web server.

A Web server is a software program on a Web host computer that answers requests from Web clients, typically over the Internet. All Web servers use a language or protocol to communicate with Web clients which is called Hyper Text Transfer Protocol ("HTTP"). All types of data can be exchanged among Web servers and clients using this protocol, including Hyper Text Markup Language ("HTML"), graphics, sound and video. HTML describes the layout, contents and hyperlinks of the documents and pages. Web clients when browsing:

convert user specified commands into HTTP GET requests, connect to the appropriate Web server to get information, and wait for a response. The response from the server can be the requested document or an error message.

After the document or an error message is returned, the connection between the Web client and the Web server is closed.

First version of HTTP is a stateless protocol. That is, with HTTP there is no continuous connection between each client and each server. The Web client using HTTP receives a response as HTML data or other data. This description applies to version 1.0 of HTTP protocol, while the new version 1.1 breaks this barrier of stateless protocol by keeping the connection between the server and client alive under certain conditions.

Browser

After receipt, the Web client formats and presents the data or activates an ancillary application such a sound player to present the data. To do this, the server or the client determines the various types of data received. The Web Client is also referred to as the Web Browser, since it in fact browses documents retrieved from the Web Server.

Interactive Access To Multimedia Services

Interactive electronic services, video-on-demand, and the World Wide Web are providing access to an increasing offering of movies, shopping information, games, multimedia documents, electronic commerce and many other services. A major problem in using these systems is to browse the enormous variety and quantity of possible choices to discover what is available, and to make a selection. By example, when surfing on the Web, a conventional method to navigate across many pages of hypertext documents consists of using search tools or invoking bookmarked links to the different required topics. When surfing on video-on-demand services, a conventional method to navigate is to surf on channels. Advertisements on preview channels are used as entry points to other movies. Users can navigate and make selections from a remote control using hierarchical menus. Obviously, these approaches does not allows a rapid access and browse of the thousands of multimedia documents that are available on the Web or interactive TV.

Present invention is based on the recognition of two significant facts:

People are very skilled at browsing through paper catalogs, magazines, newspapers, maps and books by flipping through the pages and glancing at pictures and text.

A collection of printed color photographs can be much easily and quickly browsed than a sequence of computer screens. Paper has a number of useful properties:

paper is easy to read, mark, and manipulate;

paper is portable, familiar and can be easily distributed.

Many electronic systems attempt to replace paper by providing many advantages such as, for example, a better access to multimedia services. But, however most users prefer to work with paper. It is difficult to foresee, for example, the replacement in the future, of paper catalogs by electronic catalogs (e.g., by Web accessible catalogs). Publication entitled "The Last Book", IBM Systems Journal, Vol 36, No. 3 Vol 36, No. 3-1997, by J. Jacobson, B. Comiskey, C. Turner, J. Albert, and P. Tsao of the MIT Media Laboratory, compares printed books and computer screens in the following terms:

"A book represents a fundamentally different entity than a computer screen in that it is a physical embodiment of a large number of simultaneous high-resolution displays. When we turn the page, we do not lose the previous page. Through evolution the brain has developed a highly sophisticated spatial map. Persons familiar with a manual or textbook can find information that they are seeking with high specificity, as evidenced by their ability to remember whether something that was seen only briefly was on the right side or left side of a page, for instance. Furthermore their haptic connection with the brain's spatial map comprises a highly natural and effective interface, when such information is embodied on actual multiple physical pages.

Another aspect of embodying information on multiple, simultaneous pages is that of serendipity and comparison. We may leaf through a large volume of text and graphics, inserting a finger bookmark into those areas of greatest interest. Similarly, we may assemble a large body of similar matter in order to view elements in contrast to one another, such as might be done to determine which of a particular set of graphical designs is most satisfying".

Out of those advantages the most important problem, of course, with traditional printed books is that they cannot be changed, amended, updated nor completed.

During the last years, due mainly to the widespread use of personal computers and the universal access of millions of users to the World Wide Web, the "multimedia publishing" has veritably exploded. Due to the widespread penetration of CD-ROM drives an enormous amount of multimedia titles combining text, images and sounds, are now accessible to owners of personal computers. In this evolution, an incredible amount of hypermedia information is today accessible via the Internet on the World Wide Web.

Even when the public's enthusiasm for new computer-based multimedia services has been seen by many analysts as a threat to the conventional forms of hard-copied publishing, particularly book publishing, the real fact is that reading a book cannot be compared with reading an electronic media. Reading paper remains preferable for most people, whether they are familiar with computers or not. Touching directly the objects we have around is one of the simplest, most instinctive, and universal human actions.

Finger pointing and touching are the most natural form of human/machine interface. The action of touching is so simple and natural that navigating by means of touch screens require no training and no learning. In fact the pervasiveness robustness and versatility of the "touch technology" is transforming the way people are living, working, learning, and playing. The "touch technology" is successfully used in many different applications, by example:

In industrial environments: Environmentally-robust touch screens are increasing productivity under hazardous and hostile conditions that would cripple a standard Personal Computer and keyboard.

In hospitals: Touch input helps doctors to prescribe medications to patients faster by allowing handwritten prescriptions.

In retail locations: Interactive, through-the-window displays let customers shop whenever they want, even when a store is closed.

In mobile and consumer devices: Touch and stylus input is the widely accepted input method for portable, and other mobile devices.

At tourist destinations: User-friendly kiosks are a cost-effective way to help travelers to get information and make their own reservations.

The two main advantages of touching are:

Simplicity: Touching with the fingertip is the simplest and more intuitive form of pointing and selecting an item, and Versatility: Touching is particularly adapted to applications where the use of a keyboard, a mouse or an optical pencil or stylus is not practical or is not well adapted to the user's service or comfort.

Traditionally, a touch panel is integrated into the computer display. The touch panel and the display forms a combination called "touch screen". The input device is integrated into the monitor, so no space is wasted, and the interaction of the user with the system is made easier. The system guides the user by showing different choices in the form of icons displayed on the screen. When the user touches the icon of its choice, the associated action is executed.

Therefore, there is a real need to provide the user with new systems and methods for improving printed texts with electronically stored data in the form of images, sounds and/or additional text.

U.S. Pat. No. 5,957,697 entitled "Printed Book Augmented with an Electronic Virtual Book and Associated Electronic Data", discloses a system and method for augmenting a printed text with electronically stored data in the form of images, sounds and/or additional text where a printed book comprising a plurality of pages of text is emulated by an electronic virtual book, that mimics the appearance of the printed book. This invention is based on the duplication of the paper book, on the creation of an electronic book over which links to hypermedia are defined and can be selected by the user.

U.S. Pat. No. 5,903,729 entitled "Method, System, and Article of Manufacture for Navigating to a Resource in an Electronic Network", discloses a method for navigating on an electronic network. The method comprises the steps of forming an electronic image of an object having a plurality of markable regions associated with a plurality of electronic resources;

processing the electronic image to detect which of the markable regions associated with the plurality of electronic resources is marked;

generating a list comprising at least one link to at least one of the electronic resources whose associated markable region is marked, and displaying a display screen based upon the list.

This invention requires image scanning and image processing means to read marked regions on hard-copied documents.

A similar approach using optical image scanners to access multimedia services is described in U.S. Pat. No. 5,640,193 entitled "Multimedia Service Access by Reading Marks on an Object". This patent discloses an apparatus and a method to enable a user to control the selection of electronic multimedia services by means of a scanner for reading marks on an object and for communicating a request signal, having an object code representing the read marks, to a user interface.

U.S. Pat. No. 5,495,581 entitled "Method and Apparatus for Linking a Document with Associated Reference Information Using Pattern Matching" also uses image scanning and pattern matching techniques. This patent discloses an apparatus for linking a portion of a document with associated reference information, wherein the linked portion is designated by a predetermined attribute of the received document image, using among several other, a device for electronically scanning the electronic representation of the document image to locate said predetermined attribute of the document's image.

U.S. Pat. No. 5,905,251 entitled "Hand-held Portable WWW Access Terminal with Visual Display Panel and GUI-based WWW Browser Program Integrated with Bar Code Symbol Reader in a Hand-supportable Housing" discloses a portable hand-held WWW access terminal for accessing HTML-encoded documents located on the WWW. The terminal includes a bar code symbol reader in a hand-supportable housing for reading URL-encoded symbols specifying the location of HTML-encoded documents stored in information servers connected to the Internet and supporting the TCP/IP standard. This invention requires the marking of physical documents with bar code symbols and requires bar code readers to trigger hyperlinks.

Finally, a different approach for having an access to mutimedia services from physical documents is proposed in U.S. Pat. No. 5,624,265 entitled "Printed Publication Remote Control for Accessing Interactive Media". This patent discloses a remote control system for an interactive media comprising a printed publication (such as a book, a magazine or a catalog), and one or a plurality of buttons physically attached to the printed publication to allow users to remotely control use of associated electronic content by a host device.

None of the methods referenced in the prior art describes a system that would enable a user to get access to hypermedia services simply by touching with a fingertip an original, unmarked, hard-copied document (e.g., over an original edition of a rare ancient book).

From the prior art analysis, there is a real, uncovered need, for a system and a method for selecting and accessing multimedia information and/or services from different items (i.e., words, icons, figures, foot notes, etc.) printed on a book, a hard-copy publication or, more generally, on any type of physical document:

simply by touching the document with the fingertip, while, at the same time, maintaining the integrity of the document.

There is a need for not modifying a document using special marks or fonts to locate, identify or visualize the different items the user can select on the document. It would desirable to highlight these items while preserving the integrity of the physical document.

Aspects of the Invention

It is an aspect of the present invention to improve the current systems and methods of selecting and accessing electronic multimedia information or services.

It is another aspect of the present invention to select and to access electronic multimedia information or services directly from a physical document.

It is another aspect of the present invention to select and access electronic multimedia information or services simply by touching items on a physical document.

It is another aspect of the present invention to create hyperlinks between items on the physical document and multimedia information or services located on servers.

It is another aspect of the present invention to highlight said items while preserving the integrity of the document.

SUMMARY OF THE INVENTION

The present invention discloses a method and system of selecting and accessing information or services by touching hyperlinked items on a physical document. The method, for use in a user system, comprises the steps of:

identifying a physical document, said physical document comprising one or a plurality of pages;

identifying a page of said physical document, said page comprising one or a plurality of predefined hyperlinked items;

identifying position of hyperlinked items comprised in said identified page referring to a hyperlink table associated with said identified document, said hyperlink table comprising for each page of the document, a list of hyperlink items, and for each hyperlink item, an indication of its position on said page;

sending for visualization on an opto-touch foil, the position of said hyperlinked items, said opto-touch foil being connected to the user system.

The method comprises the further steps of:

determining the position of a point pressed on said opto-touch foil; said opto-touch foil being placed and aligned over or under the identified page of the physical document; each one of hyperlinked items on said page corresponding to a visualized position on said opto-touch foil; said opto-touch foil being pressed at a point corresponding to a selected hyperlinked item;

identifying the selected hyperlinked item corresponding to the position of the point pressed on said opto-touch foil referring to the hyperlink table, said hyperlink table comprising an indication of the position of each hyperlinked item on the identified page;

identifying and locating information or service associated with the selected hyperlinked item referring to the hyperlink table, said hyperlink table comprising for each hyperlinked item of each page of the document the identification and location of the information or service associated with the hyperlinked item;

acessing the information or service associated with the selected hyperlinked item.

The present invention discloses a method and system of creating hyperlinks, by touching hyperlinked items on a physical document, for use in a user system. The method comprises the steps of:

creating a hyperlink table for a physical document; said physical document comprising one or a plurality of pages;

receiving and storing in said hyperlink table an identification of the physical document;

for each page of said physical document:

receiving and storing in said hyperlink table an identification of the page and an identification of hyperlinked items defined by the user on said page;

receiving and storing in said hyperlink table identification and location of information or service associated with each defined hyperlinked item;

determining the position of points pressed on a opto-touch foil; said opto-touch foil being placed and aligned over or under the page of the physical document; said opto-touch foil being pressed at points corresponding to the position of said defined hyperlinked items;

storing the position of the points pressed in the hyperlink table, said hyperlink table comprising for each hyperlinked item, an indication of its position on the page.

The foregoing, together with other aspects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a advantageous mode of use, further aspects and advantages thereof, will best be understood by reference to the following detailed description of an illustrative detailed embodiment when read in conjunction with the accompanying drawings, wherein:

FIG. 6 shows a physical document.

FIG. 7 shows how items are selected and how hyperlinks are created.

FIG. 8 shows how the opto-touch foil is placed on the document.

FIG. 9 shows how the user presses the opto-touch foil over selected items.

FIG. 11 shows how to use the opto-touch foil to enter a page number and how selected items are illuminated.

FIG. 12 shows how the user presses the opto-touch foil over illuminated items.

FIG. 13 shows how the information related to the item selected by pressing the opto-touch foil placed over or under the document is displayed.

ADVANTAGEOUS EMBODIMENT OF THE INVENTION

The present invention discloses a system and method for selecting and accessing multimedia information and/or services located on a user workstation or on one or a plurality of servers connected to a communication network simply by touching with a finger items (words, letter, symbol, pictures, icon, . . . ) that are electronically illuminated over the surface of a hard-copy document or any other physical surface. The system includes:

an opto-touch foil preferably transparent, placed by the user over (or under) the document (or a portion of said document). This opto-touch foil is used:

to illuminate and highlight hyperlinked items over the surface of the physical document (or portion of the document), and to read coordinates of these hyperlinked items, an user workstation for accessing the information and/or the service associated with the hyperlinked items.

For identifying and selecting said hyperlinked items, these hyperlinked items are automatically illuminated by a luminous signal (or light spot) generated by the opto-touch foil. The opto-touch foil operates under the control of the user workstation. Illuminated items are selected by pressing the opto-touch foil. When the user selects an item among all illuminated items, the user workstation receives from the opto-touch foil a signal indicating the position of this selected item. The user workstation identifies and locate referring to a hyperlink table the information and/or the service associated with the position of the selected item. If the information and/or service is located in a remote server, a request is sent to this server. If the information and/or the service is stored in the user workstation, then this information and/or service is accessed locally.

In a particular embodiment, the user workstation is connected to the Internet network and comprises a Web Browser application. Servers are Web servers and the information or/and the service are Web pages linked to the items illuminated on the physical document and selected by the user when pressing the opto-touch foil on the corresponding point illuminated on the document.

In a advantageous embodiment, the opto-touch foil is built by stacking a transparent resistive or capacitive film, of the type commonly used to manufacture touch screens over a transparent organic light emitting device film (TOLED film).

System for Selecting and Accessing Multimedia Information

Figure 1:
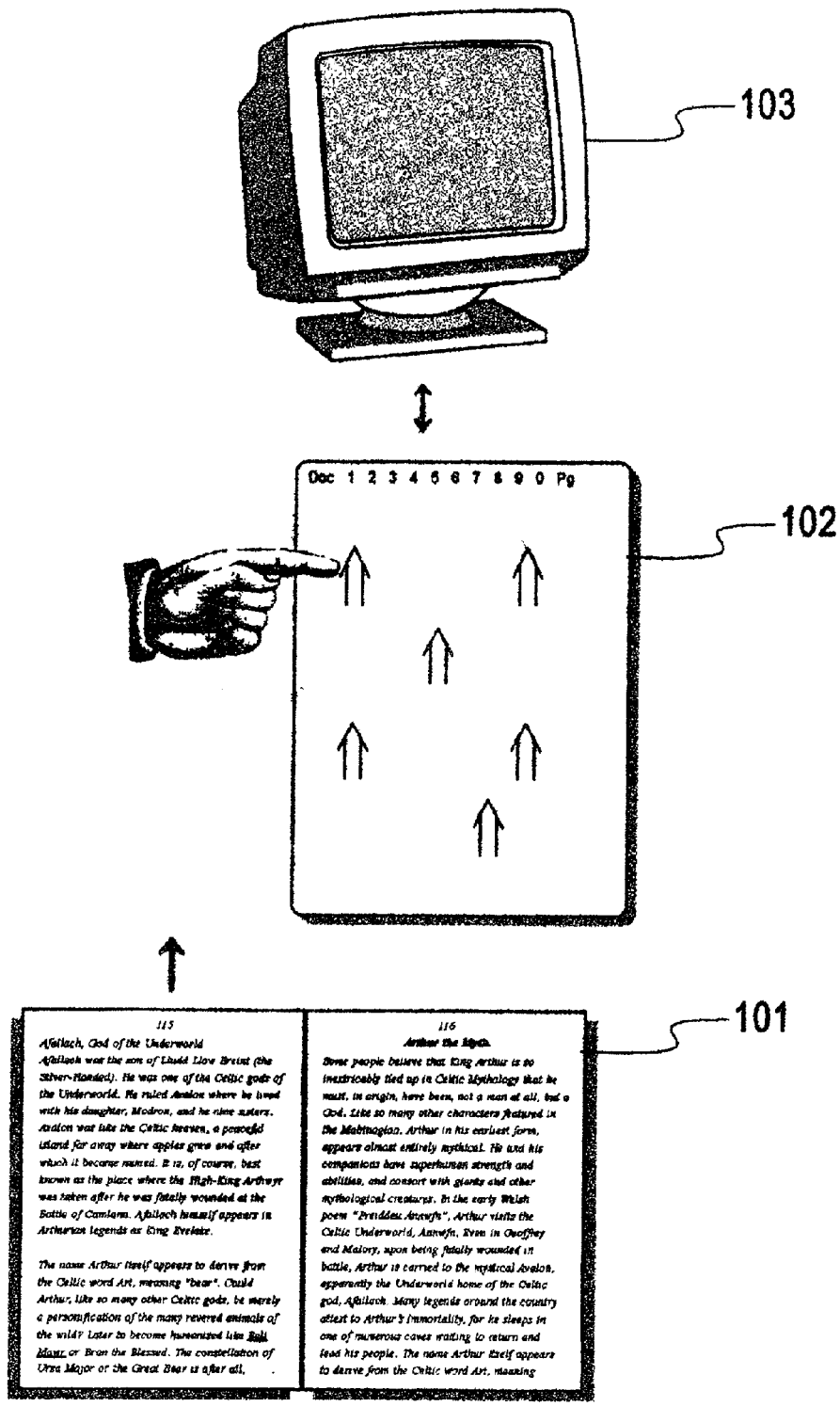
FIG. 1 shows the main components of the invention.

As shown in FIG. 1, the system according to the present invention comprises:

(101) A hard-copy document (e.g., a book) comprising one or a plurality of pages.

(102) An opto-touch foil connected to a user workstation. The opto-touch foil is to be placed over or under a page (or a portion) of the document.

(103) A user workstation (preferably connected to a communication network) for accessing and displaying multimedia information and services.

Physical Document

The physical document (101) can be of any kind, for example, a newspaper, a geographic map, a novel book, a text book, a technical book, a commercial catalog or even any other type of engraved, written, or printed surface (e.g., a painting in a museum of art). The material of the document can be paper, plastic, wood or any other material.

Opto-Touch Foil

The opto-touch foil (102) comprises two, functionally independent, transparent foils, namely:

a touch foil, and a light emitting foil (opto foil).

Figure 2:
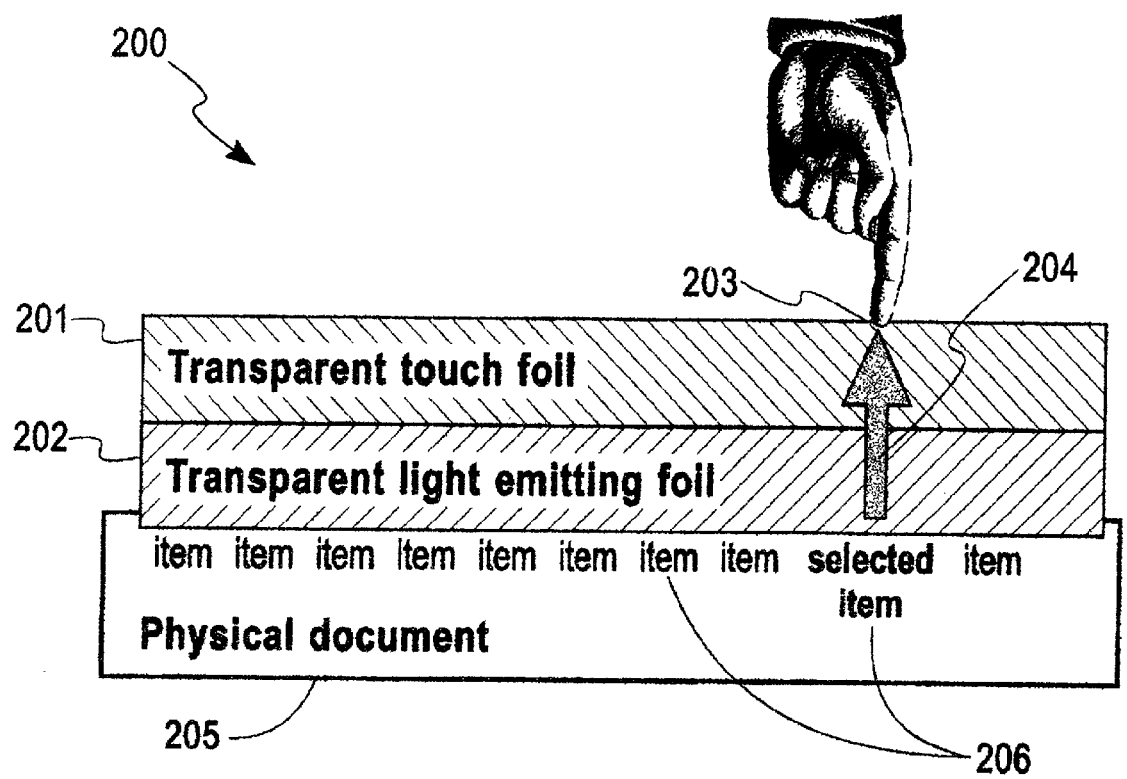
FIG. 2 shows the internal structure of the opto-touch foil.

FIG. 2 shows the cross section of an opto-touch foil (200) comprising:

a transparent resistive or capacitive touch foil (201), of the type used commonly to manufacture touch screens. The generated signal is generally proportional to the coordinates of the point that is pressed or touched (203), a transparent light emitting foil (202), which is a transparent, bright, self-emitting display that can emit light (204) from either one or both surfaces.

The combination of both foils (i.e., the touch foil stacked over the light emitting foil) forms an opto-touch foil (200). FIG. 2 represents an opto-touch foil placed and aligned over a physical document (205) comprising a plurality of items (206) (i.e., words, pictures, icons, etc.) printed (or written, painted, engraved . . . ) on its surface.

Touch Foil Technology

The touch foil component (201) may be made of transparent resistive or capacitive films of the type used commonly to manufacture touch screens. The generated signal is generally proportional to the coordinates of the point pressed. One example of touch foil technology it would be possible to use, is the TouchTek4 (4-wire Analog Resistive Touchscreens) of MICRO TOUCH company (TouchTek™ is a trademark of the MICRO TOUCH Company). The TouchTek4 technology is fully described in the Web site of MICRO TOUCH Company.

Figure 3:
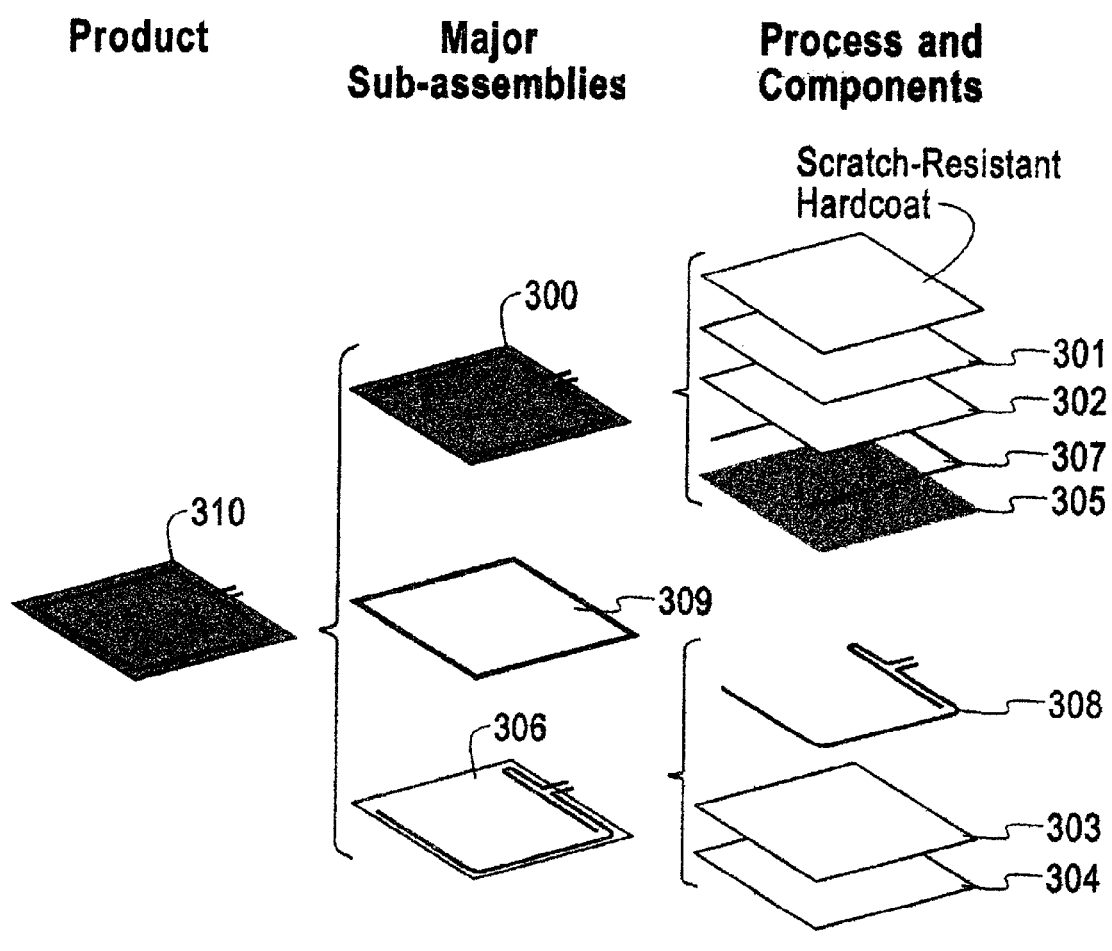
FIG. 3 shows an example of touch foil technology.

As illustrated in FIG. 3, TouchTek4 touch screens (310) use a a polyester sheet (301) with a conductive coating (302) as a vertical conductive electrode, providing one-half of a touch coordinate. The topsheet (300) is separated from the bottom layer, a glass substrate (304) with a conductive coating (303), by spacer dots (305). The bottom sheet (306) is attached to the topsheet (300) by means of an adhesive (309). The bottom sheet (306) forms the horizontal conductive electrode, generating the second half of the touch coordinate. Silver bussbars located on the topsheet (307) and on the bottom sheet (308) pass the touch coordinates to the touchscreen controller. TouchTek4 touchscreens feature hard-coated polyester topsheets (300), available in several surface finishes. Spacer dots (305) are available in several dot arrays, optimized for finger, pen and finger, or pen-only input. The conductively-coated glass bottom sheet (303, 304) is available in several thicknesses. Electronic control is provided by a serial controller, or by 4-wire controllers. TouchTek4's specifications include narrow inactive border areas and compact touch sensors which allow system designers and OEMs to provide the largest useable screen area and full mouse emulation without sacrificing functionality or consuming excess power. Apart from being suited for implementing the touch foil functions of this invention, TouchTek4 touchscreens are commonly used in hand-held personal information management systems, PDAs, mobile computing systems, automotive, diagnostics and telecom devices, and Internet appliances. TouchTek4 touchscreens are engineered to accept more than three million touches to any area of the screen.

Light Emitting Foil

The light emitting foil may be made of an array of TOLED's (Transparent Organic Light Emitting Devices), of the type used today to create vision area displays on windshields, cockpits, helmets and eyeglasses. TOLED displays, which can be up to 85% transparent when not energized are today manufactured with standard silicon semiconductors. One example of light emitting foil technology it would be possible to use is the technology used for the TOLED™s manufactured by UNIVERSAL DISPLAY CORPORATION. The TOLED technology is fully described in the Web site of UNIVERSAL DISPLAY CORPORATION.

Figure 4:
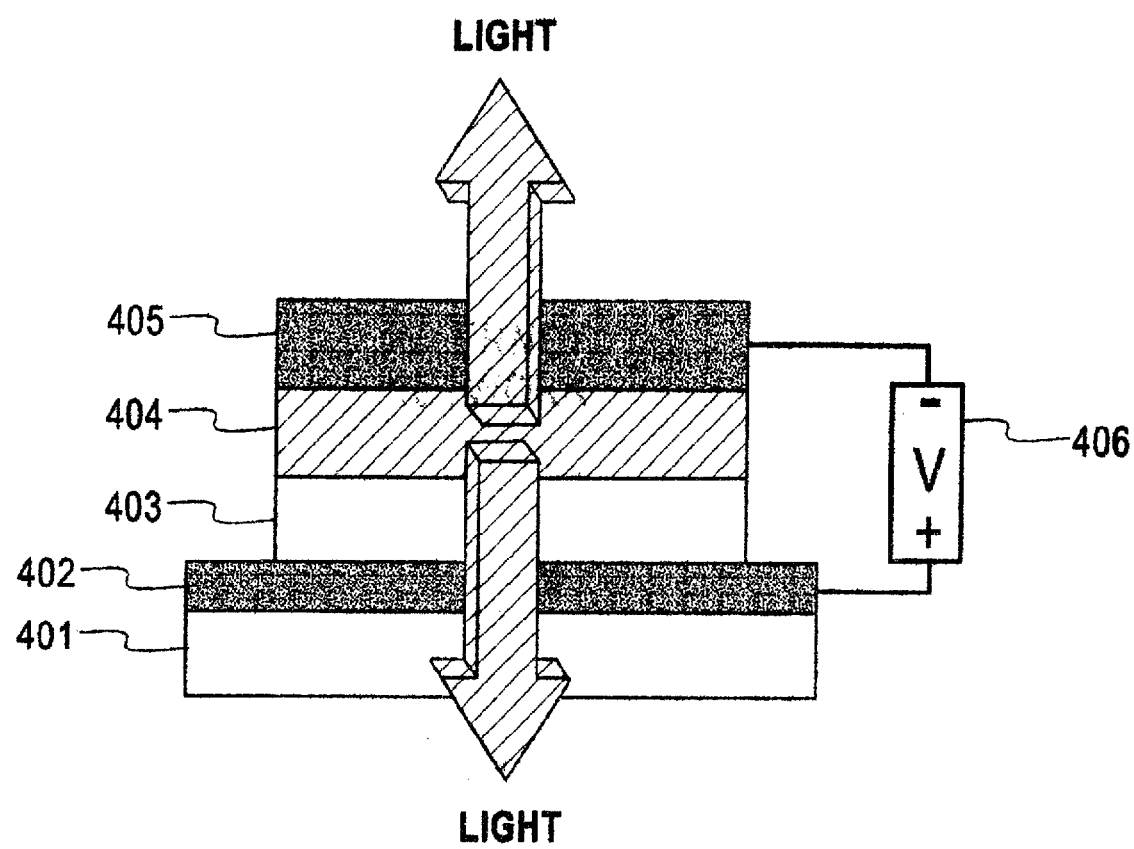
FIG. 4 shows an example of transparent light-emitting foil technology.

As illustrated in FIG. 4, in its most basic form, a TOLED is a monolithic, solid-state device consisting of a series of "small molecule" organic thin films sandwiched between two transparent, conductive layers. As a result, TOLEDs are bright, self-emitting displays that can be directed to emit from either or both surfaces. This is possible because, in addition to having transparent contacts, the organic materials are also transparent over their own emission spectrum and throughout most of the visible spectrum. Typically, a transparent conductive material (402), e.g., indium tin oxide (ITO), for hole-injection is deposited directly onto a glass substrate (401). Then, a series of organic materials are deposited by vacuum sublimation on the ITO layer: The first organic layer (403) serves as a hole-transporting layer (HTL) and the second layer (404) serves as both a light-emitting (EL) and electron-transporting layer (ETL). Finally, a transparent top contact (405) is deposited for electron injection on top of the organic films. When a voltage (406) is applied across the device, it emits light. This light emission is based upon a luminescence phenomenon wherein electrons and holes are injected and migrate from the contacts toward the organic heterojunction under the applied electric field. When these carriers meet, they form excitons (electron-hole pairs) that recombine radiatively to emit light.

TOLEDs are thin-film, solid-state devices, so they are very thin, lightweight and durable, ideal for portable applications, like the one disclosed in this invention. TOLEDs can be bottom, top, or both bottom and top emitting. Also, TOLEDs technology has attractive advantages regarding, transparency (TOLED displays can be nearly as clear as the glass or substrate they're on and when built between glass plates, TOLEDs are >80% transparent when turned off), energy efficiency (for longer battery life), full viewing angle, bright and high contrast light emission, fast response time, and environmental robustness. Thus, TOLEDs are well suited for manufacturing the light emitting foil component used jointly with the touch foil according to the present of this invention.

User Workstation

The user workstation (103) is used to access information and/or services stored locally or located on one or a plurality of servers connected to the network. The user workstation may be, for example, an Internet appliance, a multimedia Personal Computer (PC), a set-top box, a TV monitor, a game console . . . The opto-touch foil may communicate with the user workstation by means of a cable, a wire pair, an infrared link, or a wireless radio link.

Information and/or Service Access

When the user goes to a new portion of a document (101) (a new page of a book for example), he places the opto-touch foil (102) over (or under) the selected portion and enter in the workstation the reference of this portion (the page number). In a advantageous embodiment, the page number can be entered simply by touching some buttons marked on the top (or bottom) of the opto-touch foil. The page number may be also entered directly by means of the keyboard, the mouse or the touch screen of the user workstation or by any other means such as a bar code reader . . . The hyperlinked items (items that can be selected to access information on a server) on this page, are then automatically illuminated and highlighted on the surface of the document by the light emitting foil. This light emitting foil operates under the control of the user workstation (103). This illumination and highlighting allows the localization and identification of all hyperlinked items on the page selected by the user.

In order to retrieve and display a multimedia information or to access a multimedia service associated with an illuminated item on a document (101), the user touches with its finger or exercises a pressure on the portion of the opto-touch foil (102) placed over the illuminated item he wishes to select. The position of the illuminated item selected on the opto-touch foil is used to identify and locate the server and the information within this server the user wants to access. The user workstation (103) then accesses the identified server and retrieves and displays the information or/and service associated with the selected illuminated item.

World Wide Web

Figure 5:
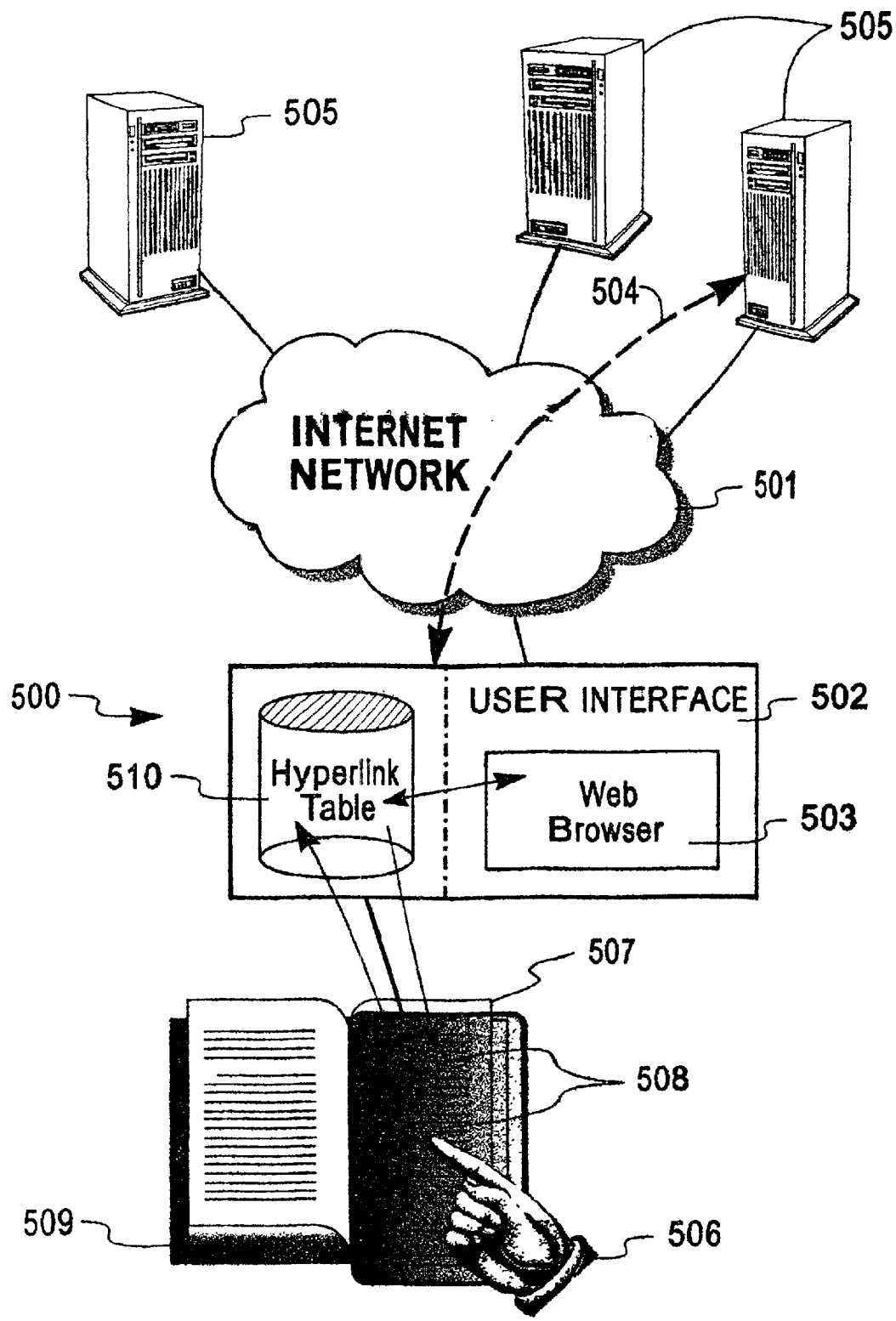
FIG. 5 shows the method of selecting and accessing Web pages from items illuminated on a physical document

In the particular embodiment of the invention shown in FIG. 5, the user workstation (500) is connected to the Internet network (501). The user workstation comprises a user interface (502) including a Web Browser (503) (also called "Web Client") to access the World-Wide-Web (WWW). In order to access the Web pages associated with an illuminated item (508) on a document (509), the user touches with its finger (506) the opto-touch foil (507) over the illuminated item (508) he wishes to select. The position of the illuminated item selected on the opto-touch foil identifies the Web server (505) and the Web pages the user wants to retrieve and display. The Web Browser program (503) sends a HTTP request (504) to the identified Web Server (505). The response to the request (HTTP response) is sent by the Web Server (505) in the reverse direction to the Web Browser (503). The HTTP response comprises the requested Web pages associated with the selected illuminated item.

Selection and Access to Information or/and Services on Servers

A) Creating Hyperlinks on a Physical Document

Figure 14:
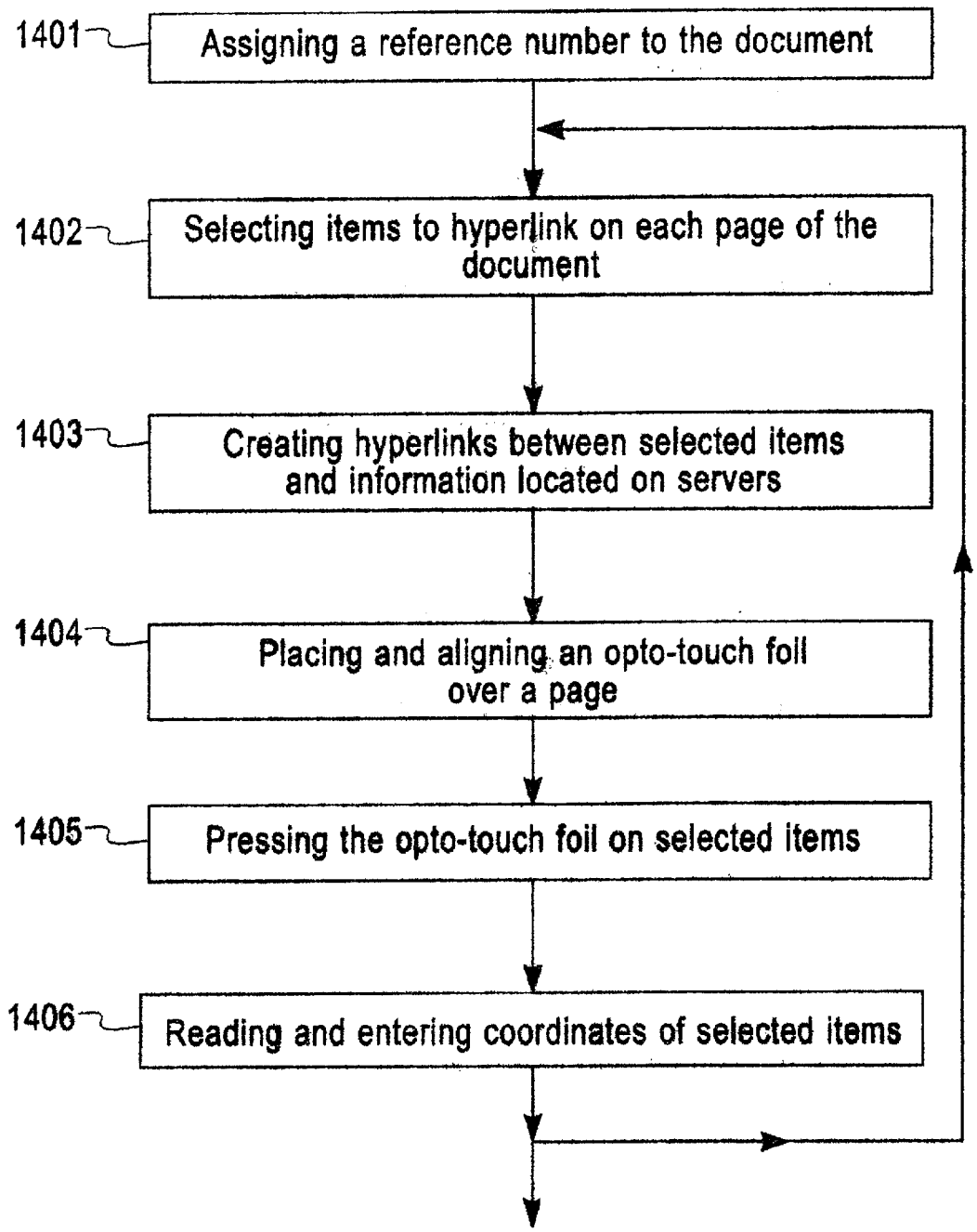
FIG. 14 is a flow chart of the method of creating hyperlinks on a physical document.

As shown in FIG. 14, the method for creating hyperlinks from a hand written or printed document (like the document shown in FIG. 6 entitled "Early British Kingdoms"), to a plurality of servers to access multimedia information or services, comprises the steps of:

(1401) assigning a reference number (identifier) to the document;

and for each page of the document (or portion of the document):

(1402) selecting items on the page;

(1403) creating hyperlinks between these selected items and information and/or services located on servers;

(1404) placing and aligning an opto-touch foil over the page;

(1405) pressing the opto-touch foil over selected items on this page;

(1406) reading and storing in an hyperlink table the position (coordinates) of selected items on this page.

(1401) Assigning a Reference Number to the Document

As shown in FIG. 6, for each document he receives, the user:

assigns a reference number to this document (e.g., 387) for identifying said document.

writes this reference number on the document, and creates an hyperlink table associated with the document and accessible from the workstation, said hyperlink table comprising the reference number of the document and other relevant information related to the document such as title, author, ISBN (International Standard Book Number), date, etc . . . The hyperlink table may be stored within the user workstation or may be stored in an external memory accessible from the user workstation.

The header of the new created hyperlink table associated with the document shown in FIG. 6, can be built as follows:

| Doc: 0387 | Title: "Early British Kingdoms" Date: 28/01/2000 | Author: David Nash Ford of Binfield, Berkshire, UK ISBN: 84-344-0856-2 |
|---|---|---|
| Pg: | | |
| X= | Link: | |
| Y= | | |

(1402) Selecting Items on Pages of the Document and (1403) Creating Hyperlinks

As shown in FIG. 7, each time the user wants to create an hyperlink for an item (701) located on a page of a document, he:

enters the page number (702) where the item is referenced in the hyperlink table of the document (e.g., 16);

associates with this item a destination address within the communication network, this destination address identifying a server connected to the communication network and the information and/or services within this server the user wants to access;

enters the destination address associated with this item (e.g., an URL address for example) in the hyperlink table.

In a advantageous embodiment, the hyperlink table associated with the page shown in FIG. 7, appears as follows:

| Doc: 0387 | | Title: "Early British Kingdoms" Date: 28/01/2000 | Author: David Nash Ford of Binfield, Berkshire, UK ISBN: 84-344-0856-2 |
|---|---|---|---|
| Pg: 16 | | | |
| X= | Y= | Link: Mabinogion | http://www.(link to) mabinogion.htm |
| X= | Y= | Link: Avalon | http://(link to) /avalon.html |
| X= | Y= | Link: Afallach | http://(link to) Afallach |
| X= | Y= | Link: Beli Mawr | http://(link to) Beli |

A convention is used throughout where an example of a hyperlink is shown—the intermediate data are omitted and replaced with the place-holder "(link to)"; e.g. http:// (link to) avalon.html.

(1404) Placing and Aligning the Opto-touch Foil over a Page of the Document

As shown in FIG. 8, after the hyperlinked items of a page have been defined in the hyperlink table associated with the document, the opto-touch foil is:

placed over (or under) the page, and aligned with the borders of this page by some conventional means (e.g., by adjusting the upper left corner of the opto-touch foil with the upper left corner of the page).

(1405) Reading the Coordinates of the Hyperlinked Items

As shown in FIG. 9, for each item previously selected on the page ("Mabinogion", "Avalon", "Afallach", "Beli Mawr"), the user presses (e.g., by the finger tip) the opto-touch foil on the corresponding item to determine the position (for instance, the coordinates) of this item on the page.

Once the measure of the coordinates of each selected item (hyperlinked item) on the page is completed, the hyperlink table is updated as follows:

| Doc: 0387 | Title: "Early British Kingdoms" Date: 28/01/2000 | Author: David Nash Ford of Binfield, Berkshire, UK ISBN: 84-344-0856-2 |
|---|---|---|
| Pg: 16 | | |
| X=30 \| Y=95 | Link: Mabinogion | http://www.(link to) mabinogion.htm |
| X=255 \| Y=150 | Link: Avalon | http://(link to) avalon.html |
| X=225 \| Y=160 | Link: Afallach | http://(link to) Afallach |
| X=190 \| Y=230 | Link: Beli Mawr | http://(link to) Beli |

For example, on page 16 of document 387 entitled "Early British Kingdoms" written by David Nash Ford of Binfield, the coordinates of the hyperlinked word "Mabinogion" are X=30/Y=95. This hyperlinked word "Mabinogion" points to the URL address http://www. (Link to) /mabinogion.htm.

Using the herein described method for the different pages of a same document, the hyperlink table would appear like this:

| Doc: 0387 | Title: "Early British Kingdoms" Date: 28/01/2000 | Author: David Nash Ford of Binfield, Berkshire, UK ISBN: 84-344-0856-2 |
|---|---|---|
| Pg: 3 | | |
| X=45 \| Y=130 | Link: Buellt & Gwerthrynion | http://(link to) buellt.html |
| X=205 \| Y=170 | Link: Caer-Baddan (Bath) | http://(link to) Gloui |
| X=75 \| Y=190 | Link: Caer-Celemion (Silchester) | http://(link to) vortigern.html |
| X=110 \| Y=255 | Link: Ceredigion | http://(link to) ceredigion.html |
| . . . . . . . . | | |
| X=30 \| Y=260 | Link: Editor Phone Number | Phone://54-26-555-1234 |
| . . . . . . . | | |
| Pg: 16 | | |
| X=30 \| Y=95 | Link: Mabinogion | http://(link to) mabinogion/mabinogion.htm |
| X=255 \| Y=150 | Link: Avalon | http://(Link to) avalon.html |
| X=225 \| Y=160 | Link: Afallach | http://(link to) Afallach |
| X=190 \| Y=230 | Link: Beli Mawr | http://(link to) Beli |
| . . . . . . . . . | | |
| . . . . . . | | |
| Pg: 39 | | |
| X=25 \| Y=30 | Link: St. Joseph of Arimathea | http://(link to) joseph.html |
| X=80 \| Y=75 | Link: The Kings of Dumnonia | http://(link to) dumnonia.html |
| X=140 \| Y=135 | Link: Eudaf Hen & Conan Meri | http://(link to) eudanc.html |
| . . . . . . . . | | |

Several types of multimedia services can be defined in the hyperlink table using different types of codes to identify service names and service addresses (e.g., http://address to access an URL address on the Internet; Phone://address to make a phone call, etc.). All these multimedia services can be accessed and retrieved from the Web simply by touching the opto-touch foil over the corresponding items highlighted on the hard-copy document.

B) Triggering Hyperlinks from a Physical Document

Figure 15:
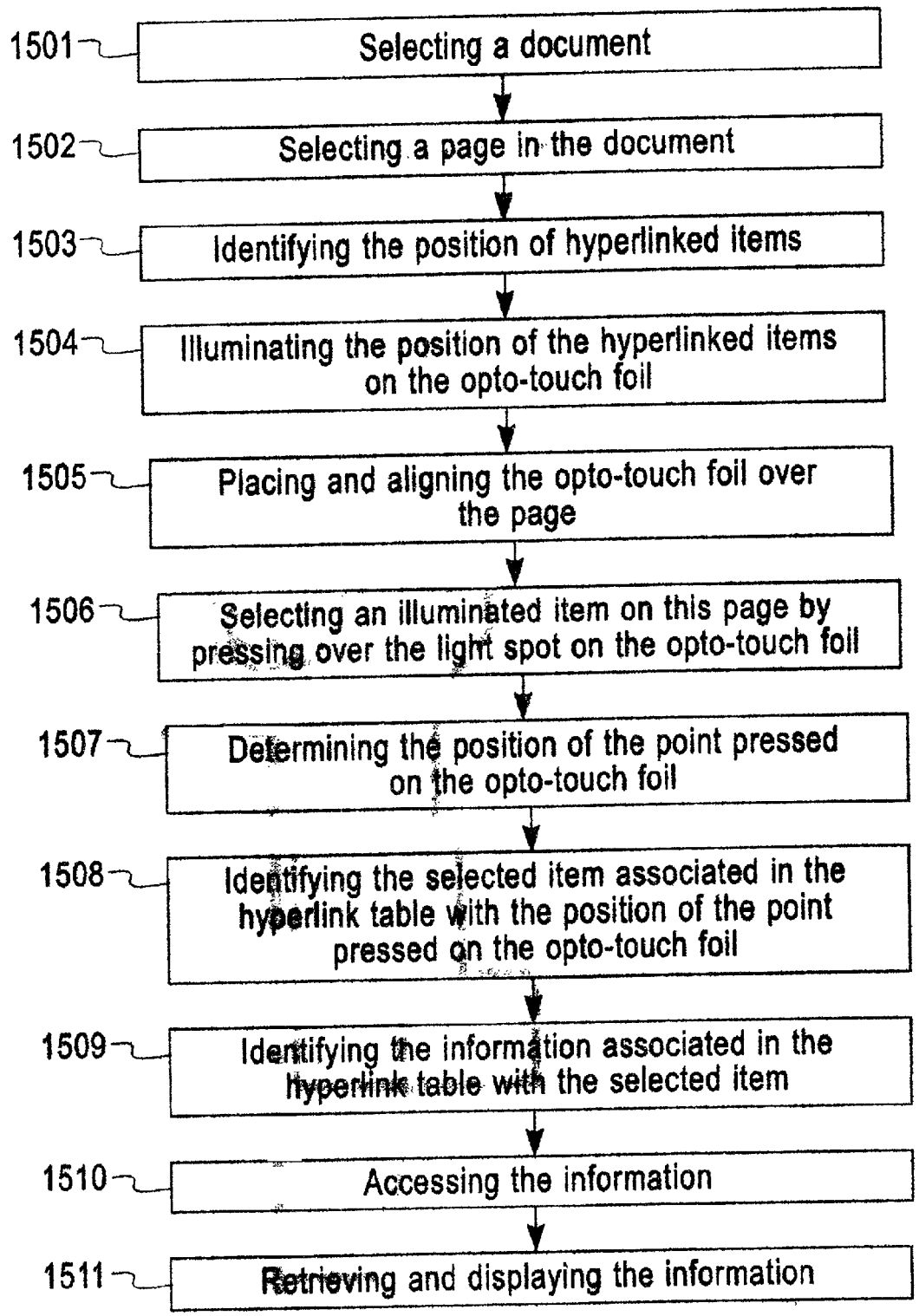
FIG. 15 is a flow chart of the method of triggering hyperlinks on a physical document.

The user receives a hand written or printed document, like the document entitled "Early British Kingdoms", (Doc: 387) shown in FIG. 6. Hyperlinks have been previously defined from items selected on pages. As shown in FIG. 15, the method of locating, visualizing and highlighting hyperlinked items, of triggering hyperlinks and of accessing information and/or services directly from these hyperlinked items highlighted on the pages of a physical document comprises the steps of:

(1501) selecting a document by entering the reference number of this document;

(1502) selecting a page of the document;

(1503) identifying for the selected page the position of predefined hyperlinked items referring to a hyperlink table associated with the selected document, said hyperlink table comprising for each page of the document, a list of hyperlink items, and for each hyperlink item, an indication of the position on an opto-touch foil;

(1504) illuminating (or visualizing, or highlighting) the position corresponding to each of said predefined hyperlinked item by means of an opto-touch foil connected to the user workstation;

(1505) placing and aligning the opto-touch foil over (or under) the selected page;

selecting an hyperlinked item on this page by pressing the opto-touch foil on the illuminated point (light spot) corresponding to the item;

determining the position of the point pressed on the opto-touch foil;

(1508) identifying the selected hyperlinked item referring to the hyperlink table, this hyperlink table comprising an indication of the position of each hyperlinked item (illuminated item) on the selected page of the document;

(1509) identifying the information or/and the service associated with the selected illuminated item referring to the hyperlink table, this hyperlink table comprising for each illuminated item of the selected page the identification of the requested information and/or service within the user workstation or within the network (preferably by means of a destination address);

(1510) accessing the information and/or service;

(1511) retrieving and displaying this information and/or service on the user workstation.

(1501) Entering the Reference Number of the Document

Figure 10:
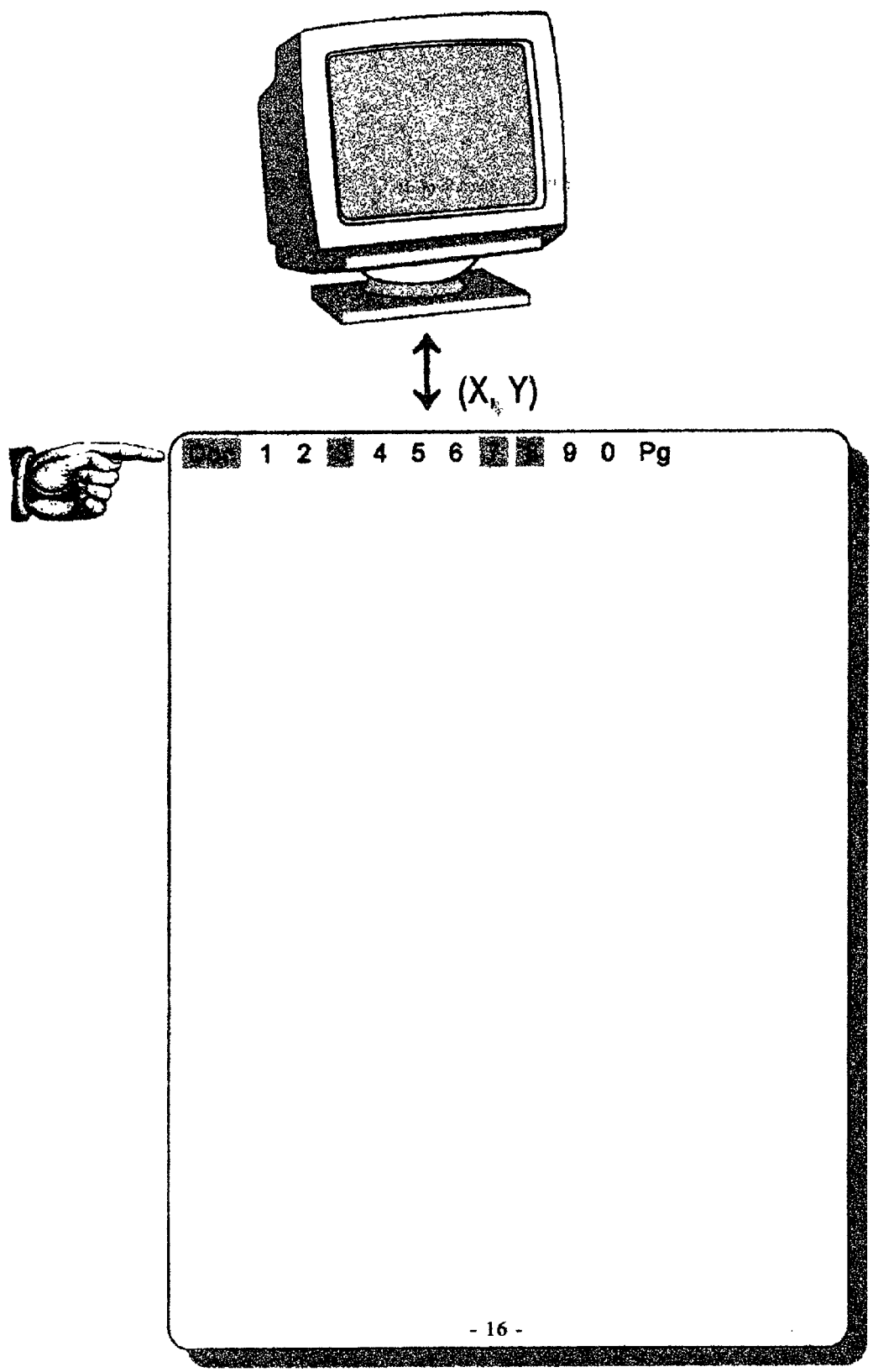
FIG. 10 shows how to use the opto-touch foil to enter the document reference number.

By means of any user interface (keyboard, mouse, touch screen, . . . ) or any reading means (bar code reader . . . ), the user enters the reference number (identifier) of the document (e.g.: document 387) he wants to select. In the particular embodiment shown in FIG. 10, the user enters the reference number of the document (e.g.: Doc: 387) by means of an array of pressure sensible "touch buttons" printed on the top of the opto-touch foil. The user presses in the following order:

a touch button marked "Doc, and then numerical touch buttons corresponding to each digit of the document reference number (e.g., "3", "8" and "7").

This procedure gives access to the hyperlink table associated with this selected document.

(1502) Selecting a Page and Highlighting Hyperlinks on this Page

By means of any user interface (keyboard, mouse, touch screen . . . ) or any reading means (bar code reader . . . ), the user enters the page of the document (or the portion of the document) (e.g.: page 16) he wants to select. In the particular embodiment shown in FIG. 11, by means of the array of pressure sensible touch buttons printed on the top of the opto-touch foil, the user enters the page number to select (e.g.: Pg. 16). The opto-touch foil can be on any position (normally the opto-touch foil is placed over the page comprising the hyperlink to trigger). The user presses in the following order:

a touch button marked as "Pg", and then numerical touch buttons corresponding to each digit of the page number (e.g., "1" and "6") to select.

This procedure gives access to the selected page (e.g., Pg. 16) within the hyperlink table associated with the selected document (e.g., Doc: 387).

(1503) Identifying the Position of Predefined Hyperlinked Items referring to the Hyperlink Table The position (coordinates X and Y) of all the hyperlinked items previously defined for the page selected by the user are retrieved from the hyperlink table and sent by the user workstation to the opto-touch foil.

(1504) Illuminating the Position Corresponding to each of said Predefined Hyperlinked Item The opto-touch foil receives the information sent by the user workstation. This information comprises the position (coordinates X and Y) of each hyperlinked item defined on the selected page. The opto-touch foil decodes this information and visualize (highlights or illumines) the position of each of the hyperlinked items.

(1505) Placing and Aligning the Opto-touch Foil over the Selected Page of the Document Once a document and a page have been selected, the opto-touch foil generates one or a plurality of light spots signaling that one or more hyperlinks have been defined for this page. Then, the opto-touch foil is:

placed over (or under) the page, and aligned with the borders of the selected page by some conventional means (e.g., by adjusting the upper left corner of the touch foil with the upper left corner of the page).

As shown also on FIG. 11, the opto-touch foil is placed and aligned over the selected page. The position of the light spots emitted by the opto-touch foil corresponds to the position of the hyperlinked items defined for this page. The hyperlink items appear through the transparent opto-touch foil and are identified by the user thanks to the light spots emitted by the opto-touch foil.

(1506) Selecting an Illuminated Item on this Page

As shown in FIG. 12, the user selects an (hyperlinked) item ("Afallach") on the page by pressing (e.g., by means of his fingertip) the opto-touch foil on the illuminated point corresponding to the selected item.

(1507) Determining the Position on the Page of the Point Pressed on the Opto-touch Foil The opto-touch foil sends a signal to the user workstation to identify the selected item. This signal indicates the position on the page of the point that has been pressed by the user on the opto-touch foil. The generated signal is generally proportional to the coordinates (X/Y) of the point that has been pressed.

In our example, the opto-touch foil measures the position on the page of the point that has been pressed (near the light spot over the word "Afallach") by the user. The coordinates that are measured at this point are around X=225 and Y=160.

(1508) Identifying the Selected Item

The illuminated item selected on the opto-touch foil by the user is identified thanks to the hyperlink table. The hyperlink table comprises an indication of the position (coordinates X and Y) of each illuminated item on each page of the document.

In our example, the coordinates measured by the opto-touch foil are around (close to) X=225 and Y=160. They corresponds in the hyperlink table to the hyperlinked item "Afallach".

The hyperlink table is either stored locally in the user workstation, or is retrieved from a remote server and then stored locally in the user workstation or is stored in a remote server and is accessed remotely.

(1509) Identifying the Information Associated with the Selected Item

The hyperlink table comprises for each hyperlinked (illuminated) item of each page of the document the location within the network of the requested information and/or service. The information and/or service may be located by means of a destination address. In the Internet network, Web pages in Web Servers are identified by an URL (Uniform resource Locator).

In our example, the hyperlink table associates the illuminated item "Afallach" with the URL:

http:// (link to) Afallach.

(1510) Accessing the Information and/or Service

The user workstation Web triggers the hyperlink (destination address, URL, . . . ) associated in the hyperlink table, with the identified selected item.

In our example, the hyperlink labeled "Afallach" is triggered since the system determines from the hyperlink table that, for this page (i.e., Pg. 16), X=225, Y=160 are the coordinates of the nearest hyperlink to the sensed position. Thus, in this example, a simple pressure near the illuminated item "Afallach" will automatically trigger the following hyperlink on the Web:

http:// (Link to) Afallach (1511) Retrieving and Displaying the Requested Information and/or Service The information contained at the selected destination address (URL) can be displayed on the user workstation. As shown in FIG. 13, additional information (e.g., document number, page number, hyperlinked item, foil coordinates and URL) related to the hyperlinked (illuminated) item selected by the user can be shown on the Web Browser along with the information retrieved from the Web Server.

Alternative Applications

Other several possible applications of the present invention are described below. Each of these applications basically use the same previously described method and system.

Installation and Engineering Instructions

A customer receives a complex computer equipment, with an installation manual comprising drawings and schemes of the parts and subassemblies. With the opto-touch foil over any one of these schemes, the user can immediately see certain parts of the complex scheme illuminated by means of bright spots. These illuminated parts are identified as hyperlinks items and can be used for accessing additional information on a remote Web server or on a local computer. When the customer touches one of those illuminated items, multimedia instructions to show how the part needs to be installed or serviced are instantly displayed. It is no more necessary to look through printed manuals to discover how a part is called and what to do with it. Furthermore, the customer does not need anymore to navigate on a computer terminal among different alternatives paging through multiple menus and choices and loosing the attention on the general picture and friendliness of the installation manual. A single printed copy of a general view of the equipment is sufficient to navigate with the system according to the present invention. The customer has just to press with his finger on the desired illuminated item on the surface of the installation manual.

Newspapers and Magazines

A subscriber reading a newspaper or magazine, may be interested in seeing computer multimedia or TV video information associated with the articles he reads. While reading the sports pages (e.g., on the New York Times), key events can be instantly recalled and played on demand (e.g., the opening ceremony of Melbourne Olympic Games, the last images of the "Tour de France", the last tennis match on Winbledon, etc . . . ) simply by touching a highlighted icon, word, letter, symbol . . . on a page of the newspaper.

Paper-Based Advertising Linked to On-Demand Multimedia Ads

Today, many free-toll calls originate from people reading advertisements in newspapers or magazines or in direct mail ads. According to the present invention, people can instantly access multimedia presentations simply by touching the ads that have drawn their attention.

Courses and Textbooks

Extensive reading is easier to do on paper, but animated video explanations and demonstrations are much more effective for some purposes. The two can be tied together by placing hyperlinked items in a textbook. These hyperlinked items can, for example, link the textbook to live discussion groups with other students or to live interactions with professors and tutors.

Particular Application

Hypermedia Access from a Paper Map

Figure 16:
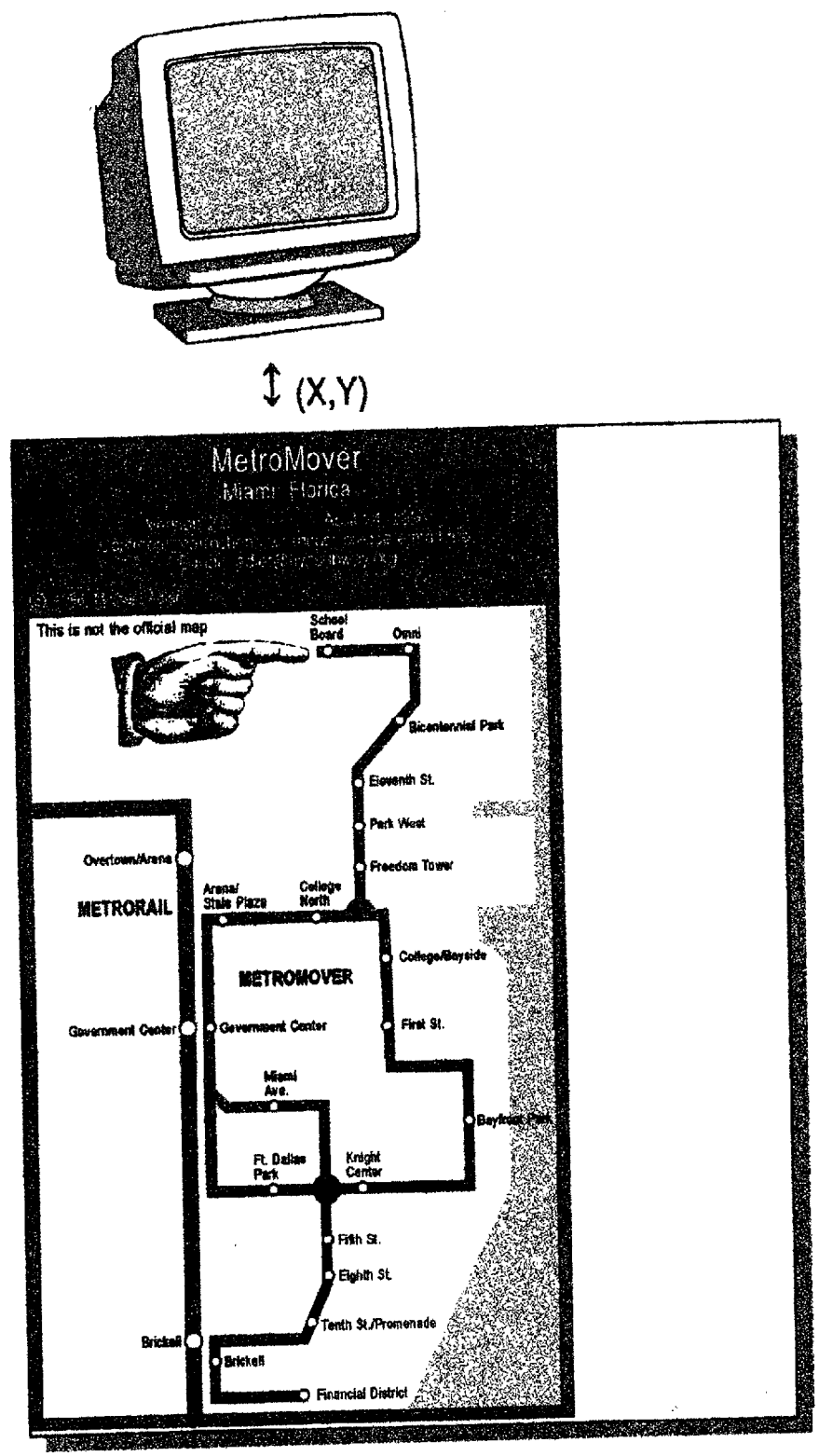
FIG. 16 shows a paper map of Miami MetroMover placed under an opto-touch foil.

In the example shown in FIG. 16, a map (e.g., a paper map of the MetroMover of Miami, Fla.) is placed and aligned underneath the opto-touch foil. By pressing the opto-touch foil over any hyperlinked station (e.g., "illuminated" by a small circular light spot on the opto-touch foil: "Freedom Tower", "Financial District", "Government Centre", . . . ), the hypermedia information of this station (i.e., the information related to the station selected on the map) is retrieved from the Web and displayed on the user workstation. This workstation may be installed, for example, on walls of any metro station.

Apart from the herein described applications, there are many other possible applications of this invention. For example, the same paper catalog can be published (by the service provider or by third parties) for individuals having different focus of interest. Old movies, westerns, or multi-user interactive games can be differently highlighted on the same catalog. Phone numbers or phone icons can be highlighted on newspaper advertisements, magazines, books and pamphlets, allowing customers to make toll-free phone calls simply by touching an illuminated point on an opto-touch foil. Home shopping retailers can provide catalogs of specialties. They can highlight special offerings and promotions. Distance learning applications can access rich content images or movies to complement the illustrations of student's books, etc . . .

What has been described is merely illustrative of the application of the principles of the present invention. Other arrangements and methods can be implemented by those skilled in the art without departing from the spirit and scope of the present invention.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent aspects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method comprising:

selecting and accessing information or services by touching hyperlinked items on a physical document, said method for use in a user system includes the steps of:

identifying a physical document, said physical document comprising at least one page;

identifying a page of said physical document, said page comprising one or a plurality of predefined hyperlinked items;

identifying position of hyperlinked items comprised in said identified page referring to a hyperlink table associated with said identified document, said hyperlink table comprising for each page of the document, a list of hyperlink items, and for each hyperlink item, an indication of its position on said page; and sending for visualization on an opto-touch foil, the position of said hyperlinked items, said opto-touch foil being connected to the user system.

2. The method according to claim 1, comprising the further steps of:

determining the position of a point pressed on said opto-touch foil; said opto-touch foil being placed and aligned over or under the identified page of the physical document; each one of hyperlinked items on said page corresponding to a visualized position on said opto-touch foil; said opto-touch foil being pressed at a point corresponding to a selected hyperlinked item;

identifying the selected hyperlinked item corresponding to the position of the point pressed on said opto-touch foil referring to the hyperlink table, said hyperlink table comprising an indication of the position of each hyperlinked item on the identified page;

identifying and locating information or service associated with the selected hyperlinked item referring to the hyperlink table, said hyperlink table comprising for each hyperlinked item of each page of the document the identification and location of the information or service associated with the hyperlinked item; and accessing the information or service associated with the selected hyperlinked item.

3. The method according to claim 1, wherein said user system is connected to a communication network comprising one or plurality of servers, and wherein the information or services associated with the hyperlinked items are located on said one or plurality of servers or locally on the user system.

4. The method according to claim 1, wherein the information or services associated with the hyperlinked items are located on the user system.

5. The method according to claim 1, comprising the further step of:
  accessing the hyperlink table associated with the identified physical document.

6. The method according to any one of the preceding claims wherein the step of identifying and locating information or service associated with the selected hyperlinked item referring to said hyperlink table comprises the step of:
  determining a destination address in the communication network where the information or service associated with the selected hyperlinked item can be accessed referring to said hyperlink table.

7. The method according to claim 1, wherein:
  said communication network is an Internet Protocol (IP) network;
  said servers are Web servers;
  said user system comprises a Web browser;
  said destination address is an Uniform Resource Locator (URL address);
  said information or service are Web pages.

8. The method according to any one of claims 1–5, wherein the physical document is a hard-copy document having any type of physical surface, formed of any material and of any form; and said opto-touch foils is substantially transparent and disposed above said physical document, whereby said document is visible through said opto-touch foil.

9. The method according to claim 1, wherein a hyperlinked item on a physical document corresponds to a word, a letter, an icon, a graphic, a symbol, a mark or any other sign printed, engraved, written or painted on the physical document.

10. The method according to claim 1, wherein the hyperlink table associated with the document comprises additional information related to said document such as title, author, date and wherein the method comprises the further step of:
  accessing said additional information.

11. The method according to claim 1, wherein the identified page is a portion of said physical document.

12. A user workstation comprising a computer system having a hyperlink table and a computer program adapted for carrying out the method comprising the steps of:
  identifying a physical document, said physical document comprising at least one page;
  identifying a page of said physical document, said page comprising one or a plurality of predefined hyperlinked items;
  identifying position of hyperlinked items comprised in said identified page referring to a hyperlink table associated with said identified document, said hyperlink table comprising for each page of the document, a list of hyperlink items, and for each hyperlink item, an indication of its position on said page; and
  sending for visualization on an opto-touch foil, the position of said hyperlinked items, said opto-touch foil being connected to the user system.

13. A system comprising:
  an opto-touch foil to be aligned with a page of a physical document;
  a user workstation comprising a computer system having a hyperlink table and having software adapted for carrying out the method comprising the steps of:
    identifying a physical document, said physical document comprising at least one page;
    identifying a page of said physical document, said page comprising one or a plurality of predefined hyperlinked items;
    identifying position of hyperlinked items comprised in said identified page referring to a hyperlink table associated with said identified document, said hyperlink table comprising for each page of the document, a list of hyperlink items, and for each hyperlink item, an indication of its position on said page; and
    sending for visualization on an opto-touch foil, the position of said hyperlinked items, said opto-touch foil being connected to the user system; and
  a connection between said opto-touch foil and said user workstation.

14. The system according to claim 13, wherein the opto-touch foil is sensible to the pressure exercised over any point and comprises a transparent film with light emitting elements for visualizing selected positions on its surface.

15. A computer program comprising computer readable instructions for carrying out the method comprising the steps of:
  selecting and accessing information or services by touching hyperlinked items on a physical document, said method for use in a user system includes the steps of:
    identifying a physical document, said physical document comprising at least one page;
    identifying a page of said physical document, said page comprising one or a plurality of predefined hyperlinked items;
    identifying position of hyperlinked items comprised in said identified page referring to a hyperlink table associated with said identified document, said hyperlink table comprising for each page of the document, a list of hyperlink items, and for each hyperlink item, an indication of its position on said page; and
    sending for visualization on an opto-touch foil, the position of said hyperlinked items, said opto-touch foil being connected to the user system.

16. A method comprising:
  creating hyperlinks, by touching hyperlinked items on a physical document, for use in a user system, including the steps of:
    creating an hyperlink table for a physical document; said physical document comprising one or a plurality of pages;
    receiving and storing in said hyperlink table an identification of the physical document; and
  for each page of said physical document:
    receiving and storing in said hyperlink table an identification of the page and an identification of hyperlinked items defined by the user on said page;
    receiving and storing in said hyperlink table identification and location of information or service associated with each defined hyperlinked item;
    determining the position of points pressed on a opto-touch foil; said opto-touch foil being placed and aligned with the page of the physical document; said opto-touch foil being pressed at points corresponding to the position of said defined hyperlinked items; and storing the position of the points pressed in the hyperlink table, said hyperlink table comprising for each hyperlinked item, an indication of its position on the page.

17. The method according to claim 16, wherein said user system is connected to a communication network comprising one or plurality of servers, and wherein the information or services associated with the hyperlinked items are located on said one or plurality of servers.

18. The method according to claim 16, wherein the information or services associated with the hyperlinked items are located on the user system.

19. The method according to claim 16, wherein the step of storing in said hyperlink table an identification within the communication network of information or service associated with each hyperlinked item comprises the step of:
   storing a destination address in the communication network where the information or service associated with the hyperlinked item can be accessed.

20. The method according to claim 16, wherein:
   said communication network is an Internet Protocol (IP) network;
   said servers are Web servers;
   said user system comprises a Web browser;
   said destination address is an Uniform Resource Locator (URL address);
   said information or service are Web pages.

21. The method according to any one of claims 16 to 20, wherein the physical document is a hard-copy document having any type of physical surface, formed of any material and of any form; and said opto-touch foils is substantially transparent and disposed above said physical document, whereby said document is visible through said opto-touch foil.

22. The method according to claim 16, wherein an item on a physical document is a word, a letter, an icon, a graphic, a symbol, a mark or any other sign.

23. The method according to claim 16, comprising the further step of:
   storing in the hyperlink table additional information related to said document.

24. The method according to claim 16, wherein each page is a portion of said physical document.

25. An user workstation comprising a computer system having a hyperlink table and a computer program adapted for carrying out the method comprising:
   creating hyperlinks, by touching hyperlinked items on a physical document, for use in a user system, including the steps of:
      creating a hyperlink table for a physical document; said physical document comprising one or a plurality of pages;
      receiving and storing in said hyperlink table an identification of the physical document; and
   for each page of said physical document:
      receiving and storing in said hyperlink table an identification of the page and an identification of hyperlinked items defined by the user on said page;
      receiving and storing in said hyperlink table identification and location of information or service associated with each defined hyperlinked item;
      determining the position of points pressed on a opto-touch foil; said opto-touch foil being placed and aligned with the page of the physical document; said opto-touch foil being pressed at points corresponding to the position of said defined hyperlinked items; and
      storing the position of the points pressed in the hyperlink table, said hyperlink table comprising for each hyperlinked item, an indication of its position on the page.

26. A system according to claim 25 comprising:
   an opto-touch foil to be aligned with a page of a physical document; and
   a connection between said opto-touch foil and said user system.

27. The system according to claim 26, wherein the opto-touch foil is sensible to the pressure exercised over any point; is disposed over said page of a physical document; and comprises a transparent film with light emitting elements for visualizing selected positions on its surface.

28. A computer program comprising computer readable instructions for carrying out the method comprising the steps of:
   creating hyperlinks, by touching hyperlinked items on a physical document, for a user system;
   creating a hyperlink table for a physical document;
      said physical document comprising one or a plurality of pages;
   receiving and storing in said hyperlink table an identification of the physical document; and
   for each page of said physical document;
      receiving and storing in said hyperlink table an identification of the page and an identification of hyperlinked items defined by the user on said page;
      receiving an storing in said hyperlink table identification and location of information or service associated with each defined hyperlinked item;
      determining the position of points pressed on an opto-touch foil: said opto-touch foil being placed and aligned with the page of the physical document; said opto-touch foil being pressed at points corresponding to the position of said of said defined hyperlinked items; and
      storing the position of the points pressed in the hyperlink table, said hyperlink table comprising for each hyperlinked item, an indication of its position on the page.

29. An article of manufacture comprising a computer usable medium having computer readable program code means embodied therein for causing selection and access of information or services, the computer readable program code means in said article of manufacture comprising computer readable program code means for causing a computer to effect a method comprising the steps of:
   selecting and accessing information or services by touching hyperlinked items on a physical document, said method for use on a user system;
   identifying a physical document, said physical document comprising at least one page;
   identifying a page of said physical document, said page comprising one or a plurality of predefined hyperlinked items;
   identifying position of hyperlinked items comprised in said identified page referring to a hyperlink table associated with said identified document, said hyperlink table comprising for each page of the document, a list of hyperlink items, and for each hyperlink item, an indication of it positions on said page; and
   sending for visualization on an opto-touch foil, the position of said hyperlinked items, said opto-touch foil being connected to the user system.

30. An article of manufacture comprising a computer usable medium having computer readable program code means embodied therein for causing creation of hyperlinks, the computer readable program code means in said article of manufacture comprising computer readable program code means for causing a computer to effect creating hyperlinks, by touching hyperlinked items on a physical document, for use in a user system, including the steps of:

creating hyperlinks, by touching hyperlinked items on a physical document, for a user system;

creating a hyperlink table for a physical document;

said physical document comprising one or a plurality of pages;

receiving and storing in said hyperlink table an identification of the physical document; and for each page of said physical document;

receiving and storing in said hyperlink table an identification of the page and an identification of hyperlinked items defined by the user on said page;

receiving an storing in said hyperlink table identification and location of information or service associated with each defined hyperlinked item;

determining the position of points pressed on an opto-touch foil: said opto-touch foil being placed and aligned with over or under the page of the physical document; said opto-touch foil being pressed at points corresponding to the position of said of said defined hyperlinked items; and storing the position of the points pressed in the hyperlink table, said hyperlink table comprising for each hyperlinked item, an indication of its position on the page.

31. The method according to claim 2, wherein the opto-touch foil is disposed below the physical document; and the physical document is a hard-copy document having any type of physical surface and formed of any material sufficiently flexible to transmit pressure, whereby pressure on said physical document is transmitted therethrough to said opto-touch foil.

32. The method according to claim 16, wherein the opto-touch foil is disposed below the physical document; and the physical document is a hard-copy document having any type of physical surface and formed of any material sufficiently flexible to transmit pressure, whereby pressure on said physical document is transmitted therethrough to said opto-touch foil.

\* \* \* \* \*